US010950223B2

(12) United States Patent
Debnath et al.

(10) Patent No.: US 10,950,223 B2
(45) Date of Patent: Mar. 16, 2021

(54) SYSTEM AND METHOD FOR ANALYZING PARTIAL UTTERANCES

(71) Applicant: Accenture Global Solutions Limited, Dublin (IE)

(72) Inventors: Poulami Debnath, Bangalore (IN); Shubhashis Sengupta, Bangalore (IN); Harshawardhan Madhukar Wabgaonkar, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 281 days.

(21) Appl. No.: 16/105,578

(22) Filed: Aug. 20, 2018

(65) Prior Publication Data

US 2020/0058295 A1 Feb. 20, 2020

(51) Int. Cl.
*G10L 15/08* (2006.01)
*G10L 15/22* (2006.01)
*G10L 25/51* (2013.01)
*G06N 20/00* (2019.01)

(52) U.S. Cl.
CPC .............. *G10L 15/08* (2013.01); *G06N 20/00* (2019.01); *G10L 15/22* (2013.01); *G10L 25/51* (2013.01); *G10L 2015/225* (2013.01)

(58) Field of Classification Search
None
See application file for complete search history.

(56) References Cited

U.S. PATENT DOCUMENTS

| 2015/0340033 | A1 | 11/2015 | Di Fabbrizio et al. |
| 2018/0308003 | A1* | 10/2018 | Singh .................. G06F 16/3343 |
| 2018/0350395 | A1* | 12/2018 | Simko .................. G10L 15/065 |

(Continued)

OTHER PUBLICATIONS

Lars Buitinck et al., "API design for machine learning software: experiences from the scikit-learn project", published Sep. 1, 2018; https://arxiv.org/pdf/1309.0238.pdf [retrieved Sep. 13, 2019].

(Continued)

*Primary Examiner* — Richa Mishra
(74) *Attorney, Agent, or Firm* — Plumsea Law Group, LLC

(57) ABSTRACT

The system and method generally include identifying whether an utterance spoken by a user (e.g., customer) is a complete or incomplete sentence. For example, the system may include a partial utterance detection module that determines whether an utterance spoken by a user is a partial utterance. The detection process may include providing a detection advice code that gives a recommendation for handling the utterance of interest. If it is determined that the utterance is an incomplete sentence, then the system and method can identify the type of utterance. For example, the system may include a partial utterance classification module that predicts the class of a partial utterance. The classification process may include providing a classification advice code that gives a recommendation for handling the utterance of interest. Once a partial utterance is detected and classified, the system and method can further determine what the user meant by the utterance and can recommend a response to the user's utterance that further advances a conversation between the user and a virtual agent.

20 Claims, 6 Drawing Sheets

(56) References Cited

U.S. PATENT DOCUMENTS

2018/0358000 A1* 12/2018 Amid .................. G06N 20/00

OTHER PUBLICATIONS

Scott Dart, "Tips on State Management At Three Different Levels", published May 8, 2017; https://developer.amazon.com/blogs/alexa/post/648c46a1-b491-49bc-902d-d05ecf5c65b4/tips-on-state-management-at-three-different-levels [retrieved Sep. 13, 2019].

Paolo Dragone, "Non-Sentential Utterances in Dialogue: Experiments in classification and Interpretation", published Nov. 22, 2015; https://arxiv.org/pdf/1511.06995.pdf [retrieved Sep. 13, 2019].

Raquel Fernandez et al., "Non-Sentential Utterances in Dialogue: A Corpus-Based Study", published Jul. 2002, In Proceedings of the 3rd SIGdial Workshop on Discourse and Dialogue—vol. 2, SIGDIAL 2002, pp. 15-26, Stroudsburg, PA, USA. Association for Computational Linguistics; https://aclweb.org/anthology/W02-0203 [retrieved Sep. 13, 2019].

Raquel Fernandez et al., "Classifying Ellipsis in Dialogue: A Machine Learning Approach", In Proceedings of the 20th International Conference on Computational Linguistics, COLING Aug. 23-27, 2004, Stroudsburg, PA, USA. Association for Computational Linguistics; https://www.aclweb.org/anthology/C04-1035 [retrieved Sep. 13, 2019].

Raquel Fernandez et al., "Using Machine Learning for Non-Sentential Utterance Classification", published Sep. 2005, 6th SIGdial Workshop on Discourse and Dialogue, Sep. 2-3, 2005, Lisbon, Portugal. ISCA Archive; https://www.isca-speech.org/archive_open/sigdial6/sgd6_077.pdf [retrieved Sep. 13, 2019].

Nitish Gautam, "Customer Service Chatbot—Using Chatbots for Customer Service and Customer Support", published Oct. 10, 2017; https://ameyo.com/blog/customer-service-chatbot-using-chatbots-for-customer-service-and-customer-support [retrieved Sep. 13, 2019].

Daniel Hardt et al., "Generation of VP Ellipsis: A Corpus-Based Approach", published 2001, In Proceedings of the 39th Annual Meeting on Association for Computational Linguistics, ACL 2001, pp. 290-297. Stroudsburg, PA, USA. Association for Computational Linguistics; https://www.aclweb.org/anthology/P01-1038 [retrieved Sep. 13, 2019].

Vineet Kumar et al., "Non-sentential Question Resolution Using Sequence to Sequence Learning", In COLING 2016, 26th International Conferene on Computational Linguistics, Proceedings of the Conference: Technical Papers, Dec. 1-16, 2016, Osaka, Japan, pp. 2022-2031. ACL; https://aclweb.org/anthology/C16-1190 [retrieved Sep. 13, 2019].

Chuan-Jie Lin et al., "Ellipsis and Coreference Resolution in a Computerized Virtual Patient Dialogue System", published in Journal of Medical Systems 2016; https://www.semanticscholar.org/paper/Ellipsis-and-Coreference-Resolution-in-a-Virtual-Lin-Pao/c5a773a5d7c0b22612cd1006ce6cc13bb6571d75 [retrieved Sep. 13, 2019].

Pierre Lison, "Structured Probabilistic Modelling for Dialogue Management", Ph.D. thesis, University of Oslo, Norway, published Oct. 30, 2013; https://pdfs.semanticscholar.org/c4c3/e3474a436efac8ecb45ea654f1d55adf0466.pdf?_ga=2.30249718.835343080.1568389120-313097033.1568389120 [retrieved Sep. 13, 2019].

Pierre Lison et al., "Developing Spoken Dialogue Systems With the Opendial Toolkit", In Proceedings of the 19th Workshop on the Semantics and Pragmatics of Dialogue, published 2015, Goteborg, Sweden; http://citeseerx.ist.psu.edu/viewdoc/download?doi=10.1.1.711.9846&rep=rep1&type=pdf [retrieved Sep. 13, 2019].

Taylor Martin et al., "The Complete List of Alexa Commands So Far", published Jan. 23, 2019; https://www.cnet.com/how-to/amazon-echo-the-complete-list-of-alexa-commands/ [retrieved Sep. 13, 2019].

Leif Arda Nielsen, "Verb Phrase Ellipsis Detection Using Automatically Parsed Text", In Proceedings of the 20th International Conference on Computational Linguistics, COLING 2009, Stroudsburg, PA, USA. Association for Computational Linguistics; https://www.aclweb.org/anthology/C04-1157 [retrieved Sep. 13, 2019].

F. Pedregosa et al., "Scikit-learn: Machine Learning in Python", Journal of Machine Learning Research, 12:2825-2830, Jun. 5, 2018; https://arxiv.org/pdf/1201.0490.pdf [retrieved Sep. 13, 2019].

Stephen G. Pulman, "Bidirectional Contextual Resolution", Computational Linguistics 26(4):497-537, Dec. 2000; https://www.mitpressjournals.org/doi/10.1162/089120100750105939 [retrieved Sep. 13, 2019].

Dinesh Raghu et al., "A Statistical Approach for Non-Sentential Utterance Resolution for Interactive QA System", In Proceedings of the SIGDIAL 2015 Conference, The 16th Annual Meeting of the Special Interest Group on Discourse and Dialogue, Sep. 2-4, 2015, Prague, Czech Republic, pp. 335-343. The Association for Computer Linguistics; https://aclweb.org/anthology/W15-4645 [retrieved Sep. 13, 2019].

Raquel Fernandez Rovira et al., "Non-Sentential Utterances in Dialogue: Classification, Resolution and Use", PhD. thesis, University of London, England, published 2006; https://staff.fnwi.uva.nl/r.fernandezrovira/papers/RaquelFernandez_PhD.pdf [retrieved Sep. 13, 2019].

Oriol Vinyals et al., "A Neural Conversational Model", published Jul. 22, 2015; https://arxiv.org/pdf/1506.05869.pdf [retrieved Sep. 13, 2019].

David Schlangen, "Towards Finding and Fixing Fragments: Using ML to Identify Non-Sentinential Utterances and their Antecedents in Multi-Party Dialogue", In Proceedings of the 43rd Annual Meetings on Association for Computational Linguistics, ACL 2005, pp. 247-254, Stroudsburg, PA, USA. Association for Computational Linguistics; https://pdfs.semanticscholar.org/687a/f193aebcc3b974057cc9c5b1b1e0bb2a2660.pdf [retrieived Sep. 13, 2019].

Sprinklr, Inc., "4 Lessons for Delivering Effective Social Customer Care", published 2017; https://digitalinfoplanet.com/assets/whitepapers/Jan20180093.pdf [retrieved Sep. 13, 2019].

Examination Report dated Jul. 30, 2020 for Australian Patent Application No. 2019219717.

Fernandez et al., "Classifying Non-Sentential Utterances in Dialogue: A Machine Learning Approach", Computational Linguistics, vol. 33, pp. 397-427, 2007 [retrieved Sep. 2, 2020].

* cited by examiner

SYSTEM AND METHOD FOR ANALYZING PARTIAL UTTERANCES

CROSS-REFERENCE TO RELATED APPLICATION

This application is related to co-pending U.S. patent application Ser. No. 16/008,337 and U.S. patent application Ser. No. 16/008,367, both filed on Jun. 14, 2018, and both of which are hereby incorporated by reference in their entirety.

TECHNICAL FIELD

The present disclosure generally relates to understanding partial, or non-sentential, utterances in human-human and human-machine dialogues. More specifically, the present disclosure generally relates to a system and method for detecting partial utterances. Even more specifically, the present disclosure generally relates to a system and method for detecting and classifying partial utterances, as well as providing instructions for responding to partial utterances.

BACKGROUND

Spoken (or natural) language understanding systems interpret the word sequences of user utterances. For example, spoken language understanding systems are used by virtual agents, such as task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Spoken language understanding systems help virtual agents determine what the human user desires. The spoken language understanding system converts the word sequences of user utterances to a hidden state representation of its meaning that the virtual agent can utilize. Then, the spoken language understanding system assigns a meaning to the hidden state representation that a downstream component of the virtual agent, such as a dialogue management system, can use to respond to the human user. Typically, a spoken language understanding system used in the context of task-oriented virtual agents can only understand complete sentences and does not have a way of handling partial utterances. Partial or non-sentential utterances have one or more words omitted from them which if otherwise present would have formed a complete, sentential form. Partial utterances present a problem in spoken language understanding because these types of utterances do not provide enough information. For example, a user just saying "yes" makes no sense without any context. Thus, such a partial utterance makes it difficult for a spoken language understanding system to do its job of determining what a human user desires. Also confusing are partial utterances with more than one word. For example, it is difficult for a spoken language understanding system to determine what a human user desires if the user says, "breaks up" without saying what is breaking up.

Dialogue management systems of virtual agents have difficulty responding to partial utterances. It is important for the virtual agent to advance a conversation with a user to identify what the user desires and to deliver what it is the user desires. It is also important for the virtual agent to maintain a natural-sounding conversation with users. However, accomplishing these tasks is difficult if the virtual agent does not understand what a user means by her utterances and does not know how to advance the conversation to identify and deliver the same.

There is a need in the art for a system and method that addresses the shortcomings discussed above.

SUMMARY

A system and method for detecting partial utterances in the context of human-machine dialogues is disclosed. The system and method solve the problems discussed above by detecting and classifying a partial utterance, as well as instructing how to respond to the partial utterance. By completing these tasks, the partial utterance analyzing system can help identify what the user wants. By knowing what a human user desires, a virtual agent can deliver what the user desires.

To detect a partial utterance, the partial utterance analyzing system compares the utterance against sets of rules that define various types of partial utterances. By comparing against these sets of rules, the partial utterance analyzing system can accurately determine whether an utterance is a partial utterance. Detecting a partial utterance helps spoken language understanding systems know when a partial utterance has been encountered. Identifying this event enables the spoken language understanding system to choose a different path from trying to figure out a user's intent or to determine slot names and values from a partial utterance. Bypassing this path increases efficiency. Instead of spending time on determining slot names and values, the spoken language understanding system can choose a path that ultimately helps the virtual agent determine how to handle a partial utterance.

By detecting whether the user utterance is a partial utterance, providing a detection advice code if the user utterance is detected as a partial utterance, classifying the user utterance into a class if the user utterance is detected as a partial utterance, and providing a classification advice code corresponding to the class, the system and method for detecting partial utterances increases efficiency by bypassing the spoken language understanding process. In other words, the system for detecting partial utterances can skip trying to figure out a user's intent or to determine slot names and values from a partial utterance and go straight to determining how to handle a partial utterance.

In addition to detecting whether an utterance is a partial utterance, the partial utterance analyzing system can provide a detection advice code with the determination that the utterance is a partial utterance. This detection advice code includes a recommendation for handling the partial utterance. As discussed below, this detection advice code can be used by a partial utterance resolution module of the partial utterance analyzing system to help the virtual agent respond to a user's partial utterance. This detection advice code may later become a resolution strategy that the dialogue management system executes, improving the actions taken by the dialogue management system. For example, the dialogue management system can execute a resolution strategy that improves the virtual agent's ability to determine and deliver what it is the user desires. Additionally, executing the resolution strategy can also improve how "human" the virtual agent's dialogue sounds.

As part of the path that helps the virtual agent determine how to handle a partial utterance, the partial utterance analyzing system classifies the utterance that have been identified as a partial utterance. While detecting a partial utterance involves finding whether the utterance fits a certain condition, classifying the utterance involves predicting whether the utterance fits within a certain class. Determining the class of an utterance helps determine how to handle a partial utterance. Like the detection process, the partial utterance analyzing system can help the virtual agent with responding to a partial utterance by providing a classification advice code with the class of the utterance. This classification advice code includes a recommendation for handling the partial utterance. As discussed below, this classification advice code can be used with the detection advice code to help the virtual agent respond to a user's partial utterance. As with the detection advice code, the classification advice code may later become a resolution strategy that the dialogue management system executes, improving the actions taken by the dialogue management system. For example, the dialogue management system can execute a resolution strategy that improves the virtual agent's ability to determine and deliver what it is the user desires. Additionally, executing the resolution strategy can also improve how "human" the virtual agent's dialogue sounds and/or reacts.

The partial utterance analyzing system may determine a resolution strategy to recommend to the dialogue management system to advance the conversation with the user. For example, the partial utterance analyzing system can look to previous utterances by the user for context to piece together what the user meant by multiple, consecutive utterances. In another example, the partial utterance analyzing system may recommend responses to the user's utterance for the dialogue management system to make. In yet another example, the partial utterance analyzing system may recommend actions to be taken in response to the user's utterance. As mentioned before, these responses and actions, which may be recommended in the form of advice codes, can become resolution strategies. And these resolution strategies may be executed. For example, the dialogue management system can execute a resolution strategy that improves the virtual agent's ability to determine and deliver what it is the user desires. Additionally, executing the resolution strategy can also improve how "human" the virtual agent's dialogue sounds and/or reacts.

In one aspect, the disclosure provides a method of controlling a virtual agent by analyzing partial utterances. The method may include receiving a user utterance; obtaining a set of rules that define check conditions corresponding to the detection of partial utterances; detecting whether the user utterance is a partial utterance by comparing the user utterance with the set of rules; providing a detection advice code if the user utterance is detected as a partial utterance; classifying the user utterance into a class if the user utterance is detected as a partial utterance; providing a classification advice code corresponding to the class; and executing a resolution strategy based on one of the detection advice code and the classification advice code.

In another aspect, the disclosure provides a non-transitory computer-readable medium storing software that may comprise instructions executable by one or more computers which, upon such execution, cause the one or more computers to use a spoken language understanding system to: receive a user utterance; obtain a set of rules that define check conditions corresponding to the detection of partial utterances; detect whether the user utterance is a partial utterance by comparing the user utterance with the set of rules; provide a detection advice code if the user utterance is detected as a partial utterance; classify the user utterance into a class if the user utterance is detected as a partial utterance; provide a classification advice code corresponding to the class; and execute a resolution strategy based on one of the detection advice code and the classification advice code.

In another aspect, the disclosure provides a partial utterance analysis system, comprising one or more computers and one or more storage devices storing instructions that may be operable, when executed by the one or more computers, to cause the one or more computers to: receive a user utterance; obtain a set of rules that define check conditions corresponding to the detection of partial utterances; detect whether the user utterance is a partial utterance by comparing the user utterance with the set of rules; provide a detection advice code if the user utterance is detected as a partial utterance; classify the user utterance into a class if the user utterance is detected as a partial utterance; provide a classification advice code corresponding to the class; and execute a resolution strategy based on one of the detection advice code and the classification advice code.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

A system and method for analyzing partial utterances is disclosed. As discussed in more detail below, the system and method can be used with a virtual agent. The system and method detect and classifies partial utterances, as well as provides recommendations for responding to partial utterances.

The system and method generally include identifying whether an utterance spoken by a user (e.g., customer) is a complete or incomplete sentence. For example, the system may include a partial utterance detection module that determines whether an utterance spoken by a user is a partial utterance. The detection process may include providing a detection advice code that gives a recommendation for handling the utterance of interest. If it is determined that the utterance is an incomplete sentence, then the system and method can identify the type of utterance. For example, the system may include a partial utterance classification module that predicts the class of a partial utterance. The classification process may include providing a classification advice code that gives a recommendation for handling the utterance of interest. Once a partial utterance is detected and classified, the system and method can further determine what the user meant by the utterance and can recommend a response to the user's utterance that further advances the conversation with the user.

Figure 1:
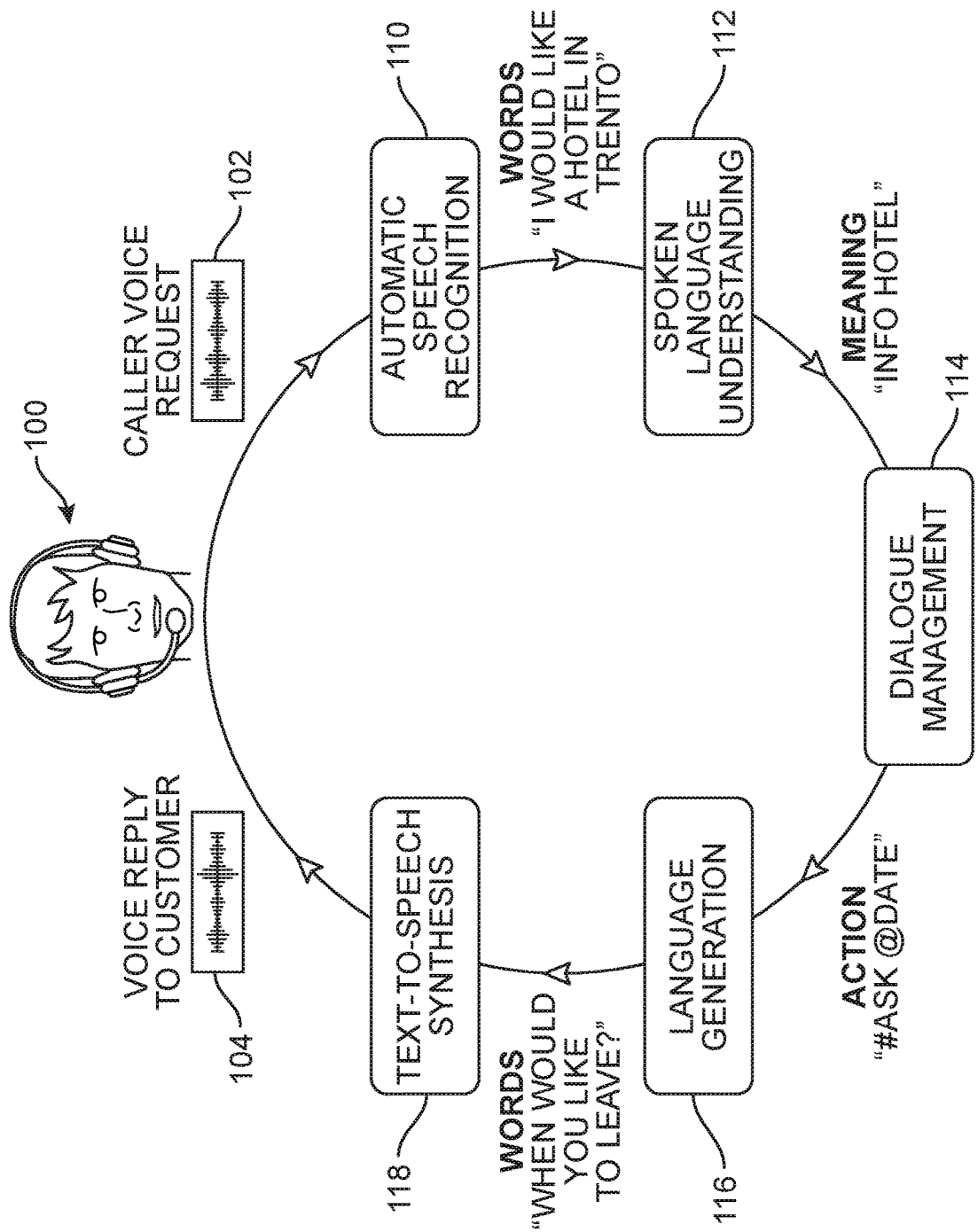
FIG. 1 is a schematic diagram of an embodiment of a virtual agent that corresponds with a customer.

In some embodiments, the system and method of understanding partial utterances may be part of a spoken language understanding system. And in some embodiments, the spoken language understanding system comprises a sub-system of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a spoken language understanding system 112.

The goal of spoken language understanding system 112 is to extract the meaning of the string of words passed on from speech recognition system 110. For example, spoken language understanding system 112 may analyze the phrase "I would like a hotel in Trento" and determine that the customer is looking for information about a hotel. More specifically, in some embodiments, the spoken language understanding system takes in a word sequence as input and outputs (1) the dialogue act category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of spoken language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence.

To deal with partial utterances, spoken language understanding system 112 may include a partial utterance analysis system. The partial utterance analysis system can detect and classify a partial utterance, as well as recommend to downstream components how to respond to the partial utterance.

The goal of dialogue management system 114 is to track the current state of the dialogue between virtual agent 100 and the customer and to respond to the request in a conversational manner. Dialogue management system 114 generates an action based on the information received from spoken language understanding system 112, as well as the state of the dialogue with the customer.

The action immediately output by dialogue management system 114 may be symbolic in nature (e.g., "# ask @date"). This symbolic output is then converted into a natural language response by a language generation system 116. For example, language generation system 116 may receive input from dialogue management system 114 (e.g., "# ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met.

Figure 2:
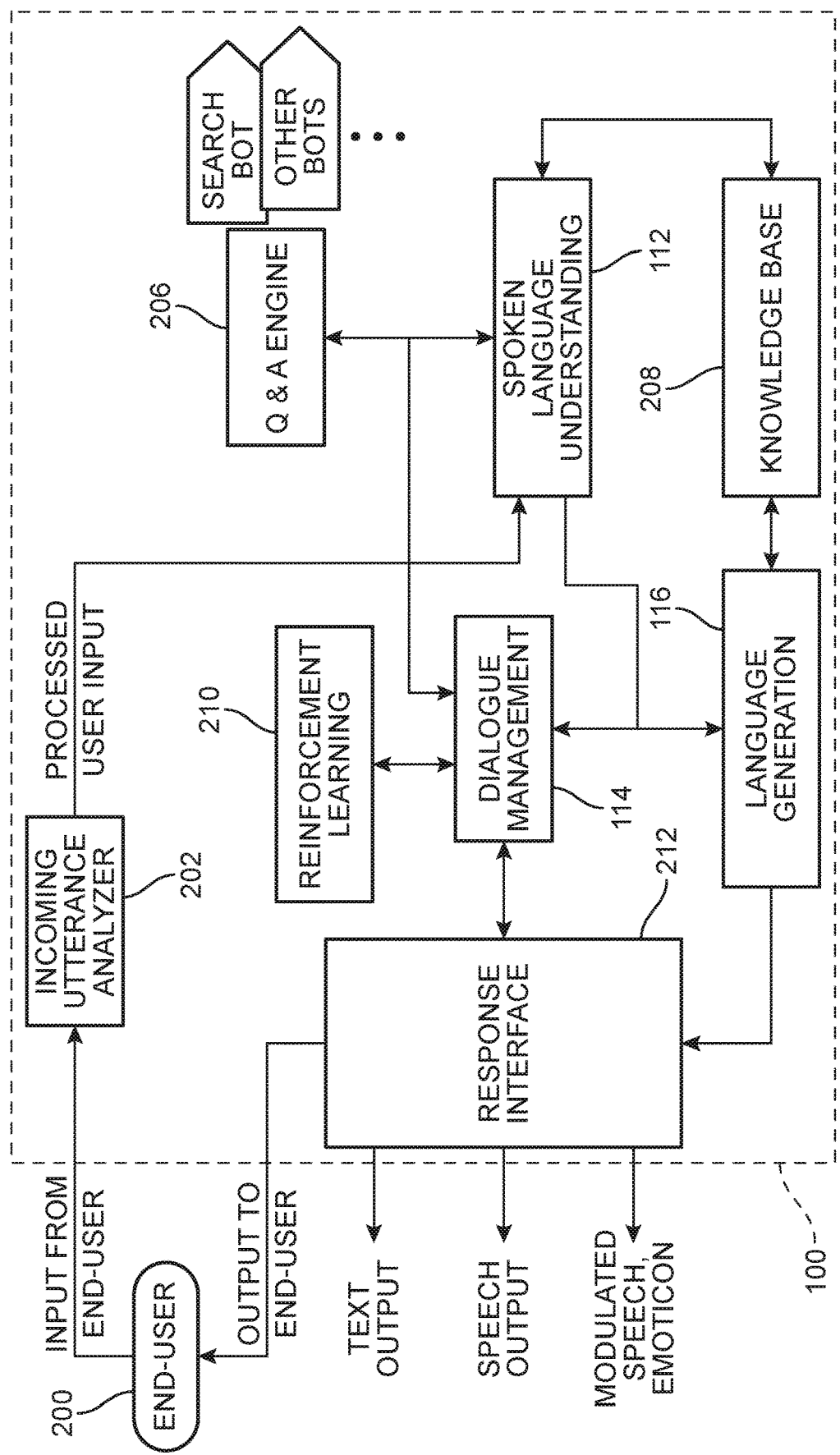
FIG. 2 is a schematic diagram of an embodiment of an architecture of a virtual agent.

A virtual agent may include additional subsystems and modules to achieve the goal of conversing with a customer and achieving the customer goals. For example, FIG. 2 is a schematic view of an embodiment of an architecture for virtual agent 100. Referring to FIG. 2, an end user 200 communicates with virtual agent 100. Communication may occur through various modes, including text-based chat programs that may run on a desktop, laptop or mobile device, telephone calls, audio and/or video calls transmitted over the internet (e.g., through services such as Skype) as well as other known modes of communication.

Input from end user 200 may be received and processed by an incoming utterance analyzer 202. In some cases, incoming utterance analyzer 202 may identify the type of input (e.g., audio, text, gestures, etc.) and direct the input to the proper sub-module (such as an automatic speech recognition module for audio input or a gesture interpreter for gesture-based inputs). The processed user input, which may take the form of strings of words, can then be passed to spoken language understanding system 112 to extract meaning from the end-user input.

Spoken language understanding system 112 may further communicate with dialogue management system 114. In some cases, spoken language understanding system 112 may also directly communicate with language generation system 116. Language generation system 116 can include modules to facilitate converting symbolic (or otherwise coded) output into a natural language format. Such modules could include a randomized machine utterance generator and a narrative generator. In some cases, natural language utterances may be generated using a Sequence Generative Adversarial Net (seqGAN).

A virtual agent can include provisions for gathering information. For example, in FIG. 2, spoken language understanding system 112 and/or dialogue management system 114 may communicate with a Q&A ("Question & Answer") Engine 206. Q&A Engine 206 can include sub-modules for identifying a question and determining if the question has been previously stored (or indexed) or if it is a new question. Q&A Engine 206 can also include provisions for searching for information on the web or in other systems accessible by virtual agent 100. For example, to look up the answer to a particular question, Q&A Engine 206 may use a search bot and/or other kinds of bots. In some cases, Q&A Engine 206 may access external services through an application protocol interface (API).

A virtual agent can include provisions for storing various kinds of information. For example, virtual agent 100 can include a knowledge base system 208. Knowledge base system 208 could include databases for storing a training collection, user and state info, and various kinds of domain specific knowledge (e.g., in the form of a graph).

A virtual agent can include provisions for learning to converse with an end user in a natural manner. For example, virtual agent 100 may include a reinforcement learning module 210. In the example of FIG. 2, dialogue management system 114, which may be trained using reinforcement learning processes as described above, can communicate directly with reinforcement learning module 210. In some cases, reinforcement learning module 210 may only be accessed during training sessions. In other cases, reinforcement learning module 210 may be accessed while virtual agent 100 is engaged with an end user, including a real customer. It may be appreciated that in some cases, other systems of virtual agent 100 could also communicate with, and utilize the resources of, reinforcement learning module 210.

Output to a user is provided at a response interface system 212. Response interface system 212 may communicate with dialogue management system 114 and/or language generation system 116. Information received from either of these units can be converted into a final output intended for end user 200. Response interface system 212 may therefore be capable of converting inputs from other systems into text, speech, and/or other kinds of expressions (such as modulated speech, emoticons, etc.).

A virtual agent and associated systems for communicating with a virtual agent may include one or more user devices, such as a computer, a server, a database, and a network. For example, a virtual agent running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual agent using a phone (e.g., a landline or a cell phone), the communication may pass through a telecom network and/or a wide area network.

The user device may be a computing device used by a user for communicating with a virtual agent. A computing device could be may a tablet computer, a smartphone, a laptop computer, a desktop computer, or another type of computing device. The user device may include a display that provides an interface for the user to input and/or view information. For example, a user could interact with a virtual agent using a program run on a laptop computer, such as a text-based chat program, a voice-based communication program, and/or a video-based communication program. Alternatively, in some cases, the user device could be a telephone (e.g., a landline, cell phone, etc.).

One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

Figure 3:
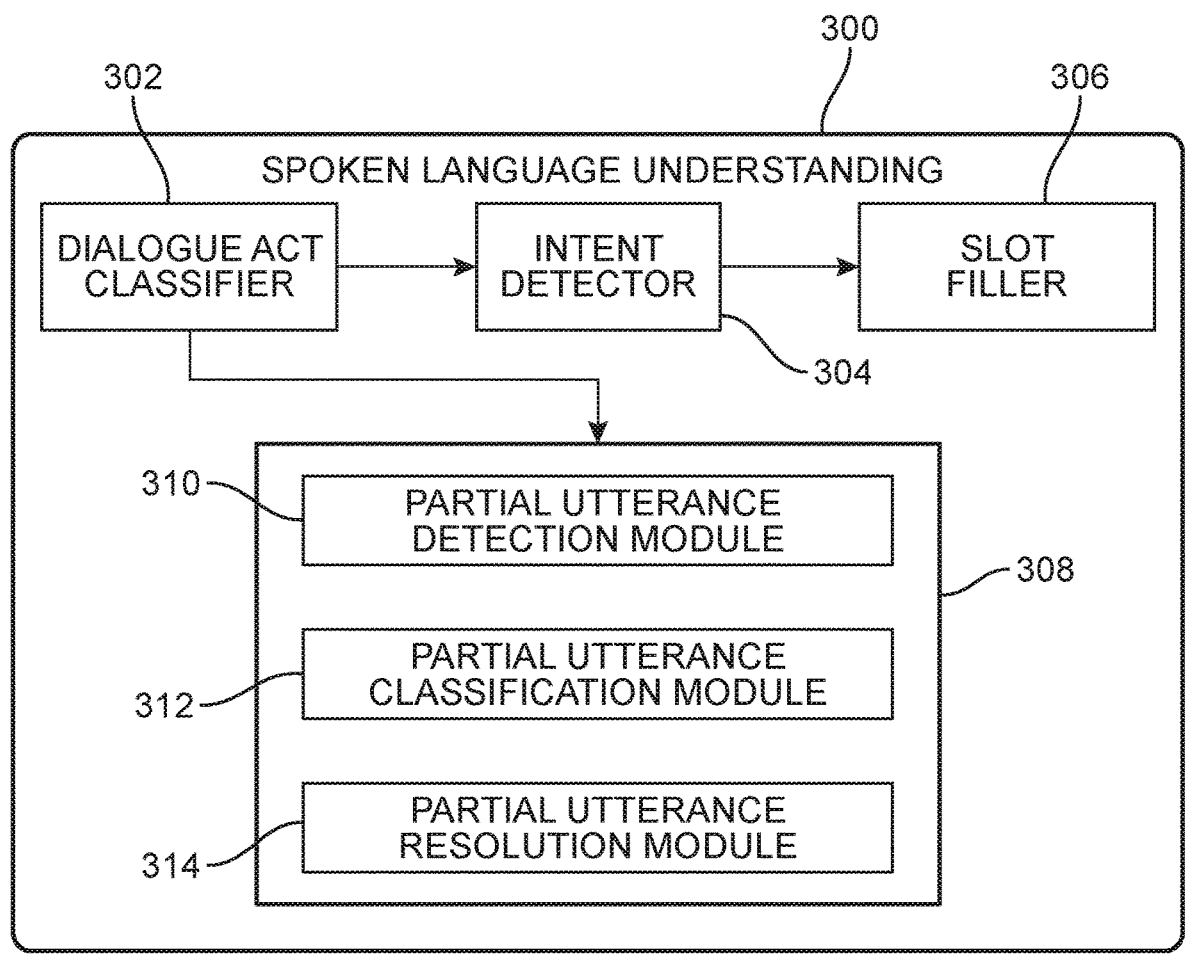
FIG. 3 is a schematic diagram of an embodiment of a spoken language understanding system.

As mentioned before, this disclosure focuses on a system and method of analyzing partial utterances. In some embodiments, this system and method of analyzing partial utterances may be part of a spoken language understanding system. FIG. 3 shows a schematic diagram of an embodiment of a spoken language understanding system 300. The spoken language understanding system generally includes three main components: a dialogue act classifier, an intent detector, and a slot filler. For example, spoken language understanding system 300 includes a dialogue act classifier 302, an intent detector 304, and a slot filler 306. The spoken language understanding system may also include a partial utterance analysis system. For example, spoken language understanding system 300 includes a partial utterance analysis system 308. The partial utterance analysis system may include a partial utterance detection module, a partial utterance classification module, and a partial utterance resolution module. For example, partial utterance analysis system 308 includes a partial utterance detection module 310, a partial utterance classification module 312, and a partial utterance resolution module 314. Below is a description of the dialogue act classifier, intent detector, and slot filler, as well as a description of a partial utterance analysis system. It is understood that the term "utterance" in this application may include a word sequence of an utterance. It is understood that an utterance may include a verbal or a text-based communication.

The dialogue act classifier classifies a word sequence into a dialogue act category. Rather than focus on the specific topic of the word sequence, the dialogue act category defines the type of communication indicated by the word sequence. Examples of dialogue act categories include question, greeting, command, and information. In one example, if a user says, "I want to fly from Seattle to Chicago," then the category is "command." In another example, if a user says, "I want to eat Chinese food that is medium-priced and from restaurants that are in the eastern part of the city," then the category is "command." In yet another example, if the user asks, "what is the weather like today?", then the category is "question."

The intent detector identifies the speaker's intent. The intent detector focuses on the specific topic of the word sequence to determine what it is the user desires. Examples of intents include flight, ground transportation, restaurant, and computer fault diagnosis. In one example, if a user says, "I want to fly from Seattle to Chicago," then the intent is "flight." In another example, if a user says, "I want to eat Chinese food that is medium-priced and from restaurants that are in the eastern part of the city," then the intent is "restaurant."

The slot filler extracts constituents from the word sequence. In other words, the slot filler finds goal-relevant pieces of information in the word sequence to determine which slot information, including slot names and slot values apply to the situation. For example, if a user says, "I want to fly from Seattle to Chicago," then the slots for this string of words could be "From-City" and "To_City." The value for the "From-City" slot is "Seattle" and the value for "To_City" is "Chicago." In another example, if a user says, "I want to eat Chinese food that is medium-priced and from restaurants that are in the eastern part of the city," the slots for this string of words could be "food", "price", and "area". The value for "food" is "Chinese". The value for "price" is "medium". The value for "area" is "Eastern".

When a user makes a partial utterance, the dialogue act classifier, intent detector, and/or slot filler may not be able to process the utterance into a meaningful dialogue act class, intent, and/or slot value. This is because the partial utterance by itself may not have a construct fitting these categories. To better identify what the user wants, the partial utterance analysis system can process the partial utterance. As discussed in more detail below, the partial utterance analysis system can detect whether an utterance is a partial utterance. If the partial utterance analysis system detects that an utterance is a partial utterance, then the partial utterance analysis system may use classification models to predict the type of partial utterance. In other words, the partial utterance analysis system may classify the partial utterance. The partial utterance analysis system may also determine a resolution strategy to recommend to the dialogue management system to advance the conversation with the user. For example, the partial utterance analysis system can look to previous utterances by the user for context to piece together what the user meant by multiple, consecutive utterances. In another example, the partial utterance analysis system may recommend responses to the user's utterance for the dialogue management system to make. In yet another example, the partial utterance analysis system may recommend actions to be taken in response to the user's utterance.

It is understood that the partial utterance analysis system may be used by itself or in conjunction with the dialogue act classifier, intent detector, and/or slot filler. For example, in some embodiments, the spoken language understanding system may process a sequence of words through the dialogue act classifier, intent detector, and/or slot filler before processing the sequence of words through the partial utterance analysis system. In another example, the spoken language understanding system may process a sequence of words through the partial utterance analysis system before processing the sequence of words through the dialogue act classifier, intent detector, and/or slot filler.

Figure 4:
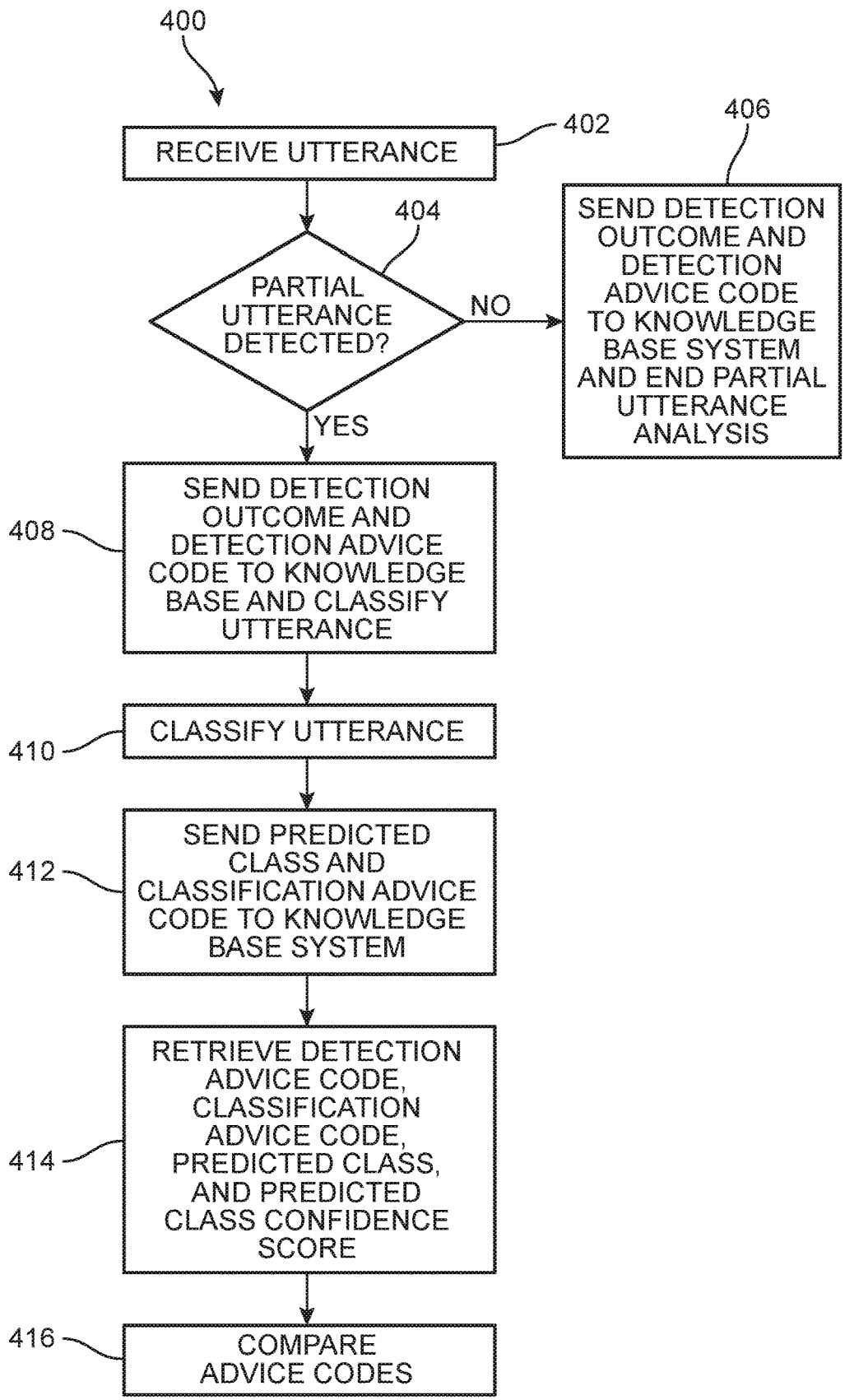
FIG. 4 is a schematic diagram of an embodiment of a method of analyzing a partial utterance.

The method of partial utterance analysis may be part of a method of controlling a virtual agent. FIG. 4 shows an embodiment of the method of analyzing a partial utterance (or method) 400. The various steps of method 400 are discussed with respect to Tables 1-9 below.

The partial utterance detection module identifies whether an utterance spoken by a user (e.g., customer) is a complete or incomplete (or partial) sentence. The partial utterance detection module provides this determination along with a selected detection advice code. The detection advice code, discussed in more detail below, is a recommendation for response by the dialogue manager. If it is determined that the utterance is an incomplete sentence, then the partial utterance classification module can classify the type of partial utterance. The partial utterance classification module provides this classification along with a selected classification advice code. The partial utterance resolution module may take the classification advice codes provided by the partial utterance detection module and the partial utterance classification module and determine a resolution strategy to recommend to the dialogue management system to advance the conversation with the user. Then, the resolution strategy may be executed. For example, the resolution strategy may be executed by the dialogue management system. In this way, the system and method for detecting partial utterances controls the virtual agent.

In some embodiments, the detection and classification processes described herein may be performed using a software library, such as spaCy (or any other language parser), an open-source software library for advanced Natural Language Processing, written in the programming languages Python and Cython.

The method of partial utterance analysis may begin with receiving an utterance. For example, method 400 includes receiving an utterance 402. In some embodiments, the spoken language understanding system may receive an utterance. In some embodiments, the partial utterance detection module may receive an utterance.

As previously mentioned, the partial utterance detection module identifies whether an utterance is a complete or partial sentence and provides an advice code. For example, method 400 includes detecting a partial utterance 404. In some embodiments, the partial utterance detection module may perform this step. To identify or detect whether an utterance is partial, the partial utterance detection module compares the utterance to check conditions defined by sets of rules, as discussed in detail below with respect to Tables 1-6. The detection advice code provided by the partial utterance detection module may correspond to the rule matched by the utterance. The advice codes provided by both the partial utterance detection module and the partial utterance classification module are discussed below with respect to Table 7.

The inputs for the partial utterance detection module may include the following fields: "utt" (utterance spoken by the user), "dac utt" (dialogue act class of utterance spoken by the user), "ant" (immediate antecedent utterance spoken by the agent), and "dac ant" (dialogue act class of immediate antecedent utterance spoken by the agent). These inputs may be received by the partial utterance detection module. In some embodiments, the dialogue act class of the user utterance may be provided by the dialogue act classifier discussed above. For example, the dialogue act classifier described in U.S. patent application Ser. No. 16/008,367, filed on Jun. 14, 2018, and which is hereby incorporated by reference in its entirety, may be used to determine the dialogue act class of the user utterance. If the user takes the first turn to start a dialogue, then the "ant" field is empty. The partial utterance detection module can still run when the "ant" field is empty.

The detection outcome may be one of the following: "yes" (indicating that the utterance spoken by the user is a partial sentence), "no" (indicating that the utterance spoken by the user is a not a partial sentence), or "rule not found" (indicating that the utterance spoken by the user could not be detected by any of the rules). The detection process may be implemented using a rule engine. The rule engine may be a linear ruleset implementation of detection heuristics. When a matching rule is found, the corresponding content for that rule may be executed and further lookup of rules may be immediately stopped.

In some embodiments, the rule-set can be separated into groups. For example, the rule-set may be separated in Group 1, Group 2, Group 3, Group 4, Group 5, and Group 6. While the embodiment discussed below includes six groups, it is understood that the rule-set may be separated into a different number of groups. For example, the rule-set may be separated into two to ten groups. In another example, the rule-set may not be separated into multiple groups and may simply form a single group. In some embodiments, the detection process may include comparing the utterance with the rules in a linear manner. For example, as discussed in more detail below, the detection process may involve comparing the utterance spoken by the user against the rules of Group 1, Group 2, Group 3, Group 4, Group 5, and Group 6 in a linear manner.

Group 1 may include a preliminary check in which the utterance/word sequence is compared against a set of rules defining common constructs. The types of utterances in this set of rules may be found in the check condition column of Table 1 below.

TABLE 1

Group 1, Preliminary Check

| Serial No. | Check Condition | Detection Outcome | Advice Code |
|---|---|---|---|
| 1 | utterance is invalid in the English language | Invalid | AD001_R001 |
| 2 | utterance is the same as the ant | No | AD001_R002 |
| 3 | utterance contains both greeting and affirmation text | Yes | AD002 |
| 4 | utterance contains both greeting and rejection text | Yes | AD003 |
| 5 | connectives are present in the beginning of utterance | Yes | AD004_R003 |
| 6 | connectives are present at the end of utterance | Yes | AD004_R004 |
| 7 | utterance contains greeting text | No | AD008 |
| 8 | auxiliary verb does not have an associated main verb | Yes | AD005 |

Table 1, as well as Tables 2-6, includes a row for each rule and four columns corresponding to each row. A first column gives serial numbers corresponding to each rule; a second column gives check conditions that the partial utterance detection module compares the utterance with; a third column gives detection outcomes corresponding to each rule; and a fourth column gives advice codes corresponding with each rule.

When the utterance matches a check condition in Group 1, the partial utterance detection module determines whether the utterance is a partial utterance. For example, if a user says "hello" the partial utterance detection module will find that condition of rule 7 matches the utterance because "hello" is a greeting. The partial utterance detection module will consequently find that the utterance is not a partial utterance. In another example, if a user says, "and times" rule 5 may be applied because "and" is a connective present in the beginning of the utterance. The partial utterance detection module will consequently find that the utterance is a partial utterance. In yet another example, if a user says "etwas" the partial utterance detection module will find that the condition of rule 1 is met because "etwas" is not a word in the English language. The partial utterance detection module will consequently find that the utterance is invalid and the Partial Utterance Analyzer would not process the utterance further.

By running this preliminary check first, the partial utterance detection module may quickly determine whether the utterance fits a common construct defined by a rule in Group 1. If the utterance does fit within a common construct defined by a rule in Group 1, then the partial utterance detection module carries out the rule and stops comparing the utterance to other rules. If the utterance does not fit within a common construct defined by a rule in Group 1, then the partial utterance detection module moves on to a more granular analysis by comparing the utterance with another set of rules. For example, in some embodiments, the partial utterance detection module may move on to comparing the utterance with the set of rules in Group 2. Because an utterance is more likely to include a common construct, in some embodiments, Group 1 may be selected for comparison before the other groups. Performing a preliminary check first and stopping further comparison eliminates going through the motions of comparing the utterance with the sets of rules in Group 2, Group 3, Group 4, Group 5, and Group 6. Accordingly, performing the preliminary check first may speed up the process of detecting a partial utterance.

Group 2 may include a set of rules corresponding to a one-word utterance (i.e., token count=1). The types of utterances in this set of rules may be found in the check condition column of Table 2 below.

TABLE 2

Group 2, Token Count = 1

| Serial No. | Check Condition | Detection Outcome | Advice Code |
|---|---|---|---|
| 9 | utterance contains affirmation text and antecedent is not empty | Yes | AD002 |
| 10 | utterance contains rejection text and antecedent is not empty | Yes | AD003 |
| 11 | utterance contains either rejection or affirmation text and antecedent is empty | Yes | AD006 |
| 12 | utterance contains sluice text | Yes | AD007 |
| 13 | utterance contains greeting text | No | AD008 |
| 14 | dialogue act class of the user utterance type is confirmation, affirmation, and turn | Yes | AD009 |
| 15 | part of speech of utterance is adverb or adjective | Yes | AD010 |
| 16 | part of speech of utterance is proper noun | Yes | AD011 |
| 17 | part of speech of utterance is noun | Yes | AD011 |
| 18 | part of speech of utterance is interjection | Yes | AD010 |

TABLE 2-continued

Group 2, Token Count = 1

| Serial No. | Check Condition | Detection Outcome | Advice Code |
|---|---|---|---|
| 19 | part of speech of utterance is verb | Yes | AD012 |
| 20 | part of speech of utterance is numeral | Yes | AD011 |

The set of rules in Group 2 involves the dialogue act class of the user utterance and part of speech values.

When the utterance matches a check condition in Group 2, the partial utterance detection module determines whether the utterance is a partial utterance. For example, if the virtual agent says, "will that be all?" and a user says "yes" the partial utterance detection module will find that condition of rule 9 matches the utterance because "yes" is an affirmation and the virtual agent had an antecedent statement. The partial utterance detection module will consequently find that the utterance is a partial utterance. In another example, if the virtual agent says, "did I answer your question?" and a user says "no" the partial utterance detection module will find that condition of rule 10 matches the utterance because "no" is rejection and the virtual agent had an antecedent statement. The partial utterance detection module will consequently find that the utterance is a partial utterance.

If the utterance does not fit within a one-word utterance defined by a rule in Group 2, then the partial utterance detection module moves on to comparing the utterance with another set of rules. For example, in some embodiments, the partial utterance detection module may move on to comparing the utterance with the set of rules in Group 3. If the utterance does fit within a one-word utterance defined by a rule in Group 2, then the partial utterance detection module carries out the rule and stops comparing the utterance to other rules. Stopping further comparison after finding a match in Group 2 eliminates going through the motions of comparing the utterance with the rules in Group 3, Group 4, Group 5, and Group 6. It has been found that users often have short utterances because they want to speed up the exchange with the virtual agent. Processing the utterance through the set of rules of Group 2 before other sets of rules may speed up the process of detecting a partial utterance because a user may be more likely to make a one-word utterance than a multiple word utterance.

In some embodiments, the partial utterance detection module may compare the utterance to the set of rules from Group 2 before comparing the utterance with sets of rules from any other groups, including Group 1. In other embodiments, the partial utterance detection module may compare the utterance to the set of rules from Group 2 without comparing the utterance with sets of rules from any other groups at all.

Group 3 may include a set of rules corresponding to utterances with 2-4 words (i.e., token count={2,3,4}) without any noun chunks and no main verbs. The types of utterances in this set of rules may be found in the check condition column of Table 3 below.

TABLE 3

Group 3, Token Count is {2, 3, 4} with no noun chunks and no main verbs

| Serial No. | Check Condition | Detection Outcome | Advice Code |
|---|---|---|---|
| 21 | utterance contains greeting text | No | AD008 |
| 22 | utterance contains affirmation text | Yes | AD002 |
| 23 | utterance contains rejection text | Yes | AD003 |
| 24 | utterance contains sluice text | Yes | AD007 |
| 25 | dialogue act class of the user utterance is of type confirmation, affirmation, and turn | Yes | AD009 |

When the utterance matches a check condition in Group 3, the partial utterance detection module determines whether the utterance is a partial utterance. For example, if a user says, "good morning" the partial utterance detection module will find that condition of rule 21 matches the utterance because "good morning" is a greeting. The partial utterance detection module will consequently find that the utterance is not a partial utterance. In another example, if a user says, "yeah sure" rule 22 may be applied because "yeah sure" is an affirmation. The partial utterance detection module will consequently find that the utterance is a partial utterance.

If the utterance does not fit within a two- to four-word utterance defined by a rule in Group 3, then the partial utterance detection module moves on to comparing the utterance with another set of rules. For example, in some embodiments, the partial utterance detection module may move on to comparing the utterance with the set of rules in Group 4. If the utterance does fit within a two- to four-word utterance defined by a rule in Group 3, then the partial utterance detection module carries out the rule and stops comparing the utterance to other rules. Comparing against Group 3 and stopping further comparison eliminates going through the motions of comparing the utterance with the rules in Group 4, Group 5, and Group 6. As previously mentioned, it has been found that users often have short utterances because they want to speed up the exchange with the virtual agent. Processing the utterance through the set of rules of Group 3 before other sets of rules may speed up the process of detecting a partial utterance because a user may be more likely to make a two- to four-word utterance if the user has not made a one-word utterance.

In some embodiments, the partial utterance detection module may compare the utterance to the set of rules from Group 3 before comparing the utterance with sets of rules from any other groups, including Group 1 and/or Group 2. In other embodiments, the partial utterance detection module may compare the utterance to the set of rules from Group 3 without comparing the utterance with sets of rules from any other groups at all.

Group 4 may include a set of rules corresponding to utterances with more than one word (i.e., token count>1}) and no main verb and no noun token. These utterances include regular expressions (i.e., coded strings or tokens that can be used to identify equivalent syntactic strings). The types of utterances in Group 4 may be found in the check condition column of Table 4 below.

TABLE 4

Group 4, Regular Expression Match for Token Count >1 and no main verb and no noun token

| Serial No. | Check Condition | Detection Outcome | Advice Code |
|---|---|---|---|
| 26 | utterance has token count of more than 1 and there are no main verbs and no noun part of speech tags and regular expression match with either of the following:<br>r'^(PROPN(CCONJ(PROPN))*)* + $'<br>(combination of proper nouns and/or conjugate words, e.g. multiple person names)<br>r'(((NUM)*)((PROPN)*)) + $'<br>(combination of proper nouns and numbers, e.g. addresses)<br>r'([A-Z]*)(((NUM)*)([A-Z]*)) + $'<br>(combination of alphabets and numbers e.g. Identification values) | Yes | AD011 |

When the utterance matches a check condition in Group 4, the partial utterance detection module determines whether the utterance is a partial utterance. For example, if a user says "Boston, Mass." the partial utterance detection module will find that condition of rule 26 matches the utterance because "Boston, Mass." includes a combination of proper nouns. The partial utterance detection module will consequently find that the utterance is a partial utterance. In another example, if a user says "4211 Jefferson Street" rule 22 may be applied because "4211 Jefferson Street" is a combination of proper nouns and numbers. The partial utterance detection module will consequently find that the utterance is a partial utterance.

If the utterance does not fit within a check condition defined by a rule in Group 4, then the partial utterance detection module moves on to comparing the utterance with another set of rules. For example, in some embodiments, the partial utterance detection module may move on to comparing the utterance with the set of rules in Group 5. If the utterance does fit within a check condition defined by a rule in Group 4, then the partial utterance detection module carries out the rule and stops comparing the utterance to other rules. Comparing against Group 4 and stopping further comparison eliminates going through the motions of comparing the utterance with the rules in Group 5 and Group 6.

In some embodiments, the partial utterance detection module may compare the utterance to the set of rules from Group 4 before comparing the utterance with sets of rules from any other groups, including Group 1, Group 2, and/or Group 3. In other embodiments, the partial utterance detection module may compare the utterance to the set of rules from Group 4 without comparing the utterance with sets of rules from any other groups at all.

Group 5 may include a set of rules corresponding to utterances with 2-4 words (i.e., token count={2,3,4}) with either a noun chunk or a main verb or utterances with greater than 4 words (i.e., token count>4). These utterances involve subject-verb-object structure of the utterance. The types of utterances in Group 5 may be found in the check condition column of Table 5 below.

TABLE 5

Group 5, Token count in {2, 3, 4} with either a noun chunk or a main verb or token count >4

| Serial No. | Check Condition | Detection Outcome | Advice Code |
|---|---|---|---|
| 27 | utterance has verb-object structure and has first word as affirmation text | Yes | AD002 |
| 28 | utterance has verb-object structure and has first word as rejection text | Yes | AD003 |
| 29 | utterance has verb-object structure and has dialogue act class of the user utterance of type command | No | AD006 |
| 30 | utterance has verb-object structure and has dialogue act class of the user utterance of type question | Yes | AD001 |
| 31 | utterance has simple subject-verb structure and has first word as affirmation text | Yes | AD002 |
| 32 | utterance has simple subject-verb structure and has first word as rejection text | Yes | AD003 |
| 33 | utterance has simple subject-verb structure and the verb is a helpful verb (non-action verbs like is, has, does, are, etc.) | Yes | AD013 |
| 34 | utterance has simple subject-verb structure without helpful verb and has dependency from adjectival complement (verb, adjective) or adverbial modifier (verb, adjective) | No | AD006 |
| 35 | utterance has simple subject-verb structure without helpful verb and has dependency form open clausal complement (verb, any part of speech form) | Yes | AD013 |
| 36 | utterance has subject-verb compound structure and has first word as affirmation text | Yes | AD002 |
| 37 | utterance has subject-verb compound structure and has first word as rejection text | Yes | AD003 |
| 38 | utterance has subject-verb compound structure with the first verb having nominal subject/nominal subject (passive) dependency and the second verb of dependency form adjectival complement (verb, adjective) | No | AD006_AD010 |
| 39 | utterance has subject-verb compound structure with the first verb having nominal subject/nominal subject (passive) dependency and the second verb of dependency form adverbial modifier (verb, adverb) | Yes | AD006_AD010 |
| 40 | utterance has subject-verb compound structure with the first verb having Nominal subject/Nominal subject (passive) Nominal subject/Nominal subject (passive) dependency and the second verb of dependency form attribute (verb, noun phrase) where noun phrase could be noun chunks, pronouns, nouns, proper nouns | No | AD006 |
| 41 | utterance has subject-verb-object structure and has first word as affirmation text | Yes | AD002 |
| 42 | utterance has subject-verb-object structure and has first word as rejection text | Yes | AD003 |
| 43 | utterance has subject-verb-object structure | No | AD006 |

When the utterance matches a check condition in Group 5, the partial utterance detection module determines whether the utterance is a partial utterance. For example, if a user says, "yes sounds good" the partial utterance detection module will find that condition of rule 27 matches the utterance because "yes sounds good" is an affirmation. The partial utterance detection module will consequently find that the utterance is a partial utterance.

If the utterance does not fit within a check condition defined by a rule in Group 5, then the partial utterance detection module moves on to comparing the utterance with another set of rules. For example, in some embodiments, the partial utterance detection module may move on to comparing the utterance with the set of rules in Group 6. If the utterance does fit within a check condition defined by a rule in Group 5, then the partial utterance detection module carries out the rule and stops comparing the utterance to other rules. Comparing against Group 5 and stopping further comparison eliminates going through the motions of comparing the utterance with the rules in Group 6.

In some embodiments, the partial utterance detection module may compare the utterance to the set of rules from Group 5 before comparing the utterance with sets of rules from any other group, including Group 1, Group 2, Group 3, and/or Group 4. In other embodiments, the partial utterance detection module may compare the utterance to the set of rules from Group 5 without comparing the utterance with sets of rules from any other groups at all.

Group 6 may include a set of rules corresponding to utterances that do not match any rules previously tested. The types of utterances in Group 6 may be found in the check condition column of Table 5 below.

TABLE 6

Group 6, Remaining Checks

| Serial No. | Check Condition | Detection Outcome | Advice Code |
|---|---|---|---|
| 44 | utterance contains sluice text and verb is missing | Yes | AD007 |
| 45 | utterance has verb missing from it | Yes | AD005 |
| 46 | domain-specific pattern matching | No | AD011 |
| 47 | default scenario | Rule Not Found | AD001 |

The check conditions in Table 6 may include question-words and missing verbs. When the utterance matches a check condition in Group 6, the partial utterance detection module determines whether the utterance is a partial utterance. For example, if a user says, "on safari" the partial utterance detection module will find that condition of rule 45 matches the utterance because "on safari" is missing a verb. The partial utterance detection module will consequently find that the utterance is a partial utterance.

When an utterance does not fit the check condition for any of the rules, the detection outcome is "Rule Not Found," which is the default scenario of rule 47.

In some embodiments, domain-specific pattern matching (e.g., member ID, user ID pattern matches) could be added to any of the rule sets. For example, in some embodiments, domain-specific pattern matching (e.g., member ID, user ID pattern matches) could be added just before the default scenario of rule 47.

As previously mentioned, the outcome of detecting whether an utterance is a partial utterance is "yes" or "no." If the outcome is "no," meaning that an utterance is not a partial utterance, then the partial utterance detection module may send the detection outcome and a corresponding detection advice code to the knowledge base system. The partial utterance detection module may end the partial utterance analysis after doing so. For example, method 400 includes a step 406 of sending the detection outcome and detection advice code to the knowledge base system and ending the partial utterance analysis. If the outcome is "yes," meaning that an utterance is a partial utterance, the partial utterance detection module may send the outcome and detection advice code to the knowledge base system. For example, method 400 includes a step 408 of sending the outcome and detection advice code to the knowledge base system.

Table 7 shows a list of exemplary advice codes that may be returned by the partial utterance detection module and the partial utterance classification module, as discussed with respect to FIG. 4 and Tables 1-6 and 8-9.

TABLE 7

Advisory Codes

| Code | Interpretation |
|---|---|
| AD001 | Request customer to rephrase |
| AD002 | Record customer affirmation |
| AD003 | Record customer rejection |
| AD004 | Join two utterance fragments |
| AD005 | Request customer's required action or extract verb from antecedent |
| AD006 | Virtual agent to take turn |
| AD007 | Respond to sluice token |
| AD008 | Greet customer |
| AD009 | Record customer acknowledgement and virtual agent to take turn |
| AD010 | Check sentiment and emotion of customer utterance |
| AD011 | Record customer's answer to antecedent question asked - short answers are typically responses to slot values asked |
| AD012 | Confirm noun (subject) from previous utterance or request the customer specifically |
| AD013 | Confirm with customer by rephrasing customer's question with the main verb from the antecedent |
| R001 | Invalid part of speech tags found in customer utterance |
| R002 | Customer is repeating VA's antecedent |
| R003 | Fragmentary connective at the beginning of utterance |
| R004 | Fragmentary connective at the end of utterance |

As previously mentioned, the partial utterance classification module classifies an utterance and provides an advice code based on the classification of the utterance. For example, method 400 includes classifying utterance 410. Classifying an utterance may include predicting a class into which the utterance falls. After predicting the class of an utterance, the partial utterance classification module may provide a classification advice code corresponding to the class into which the utterance falls. The classification advice codes corresponding to each of the classes may be the same as the advice codes listed in Table 7 above. Examples of classes and corresponding advice codes are shown below in Table 8.

TABLE 8

Classes of Partially Complete Utterances and Corresponding Advice Codes

| Class | Interpretation | Advice Code |
|---|---|---|
| Acknowledgement | Customer acknowledgement on virtual agent's antecedent utterance | AD009 |
| Affirmation Answer | Customer confirming acceptance to its antecedent | AD002 |
| Fragment by Connectives | Customer using connective phrases like but, or, and, as well as at the beginning or at the end of utterances, that make these fragmented | AD004_R003/ AD004_R004 |
| Noun Phrase Ellipsis | Noun Phrase Ellipsis, when customer utterance has the noun token or phrase elided | AD012 |

TABLE 8-continued

Classes of Partially Complete Utterances and Corresponding Advice Codes

| Class | Interpretation | Advice Code |
|---|---|---|
| Propositional Modifier | Adjective or adverbial expressions to the antecedents | AD010 |
| Rejection Answer | Customer confirming rejection to its antecedent | AD003 |
| Short Answer | Utterance that include only answers to antecedents, without proper/complete sentence formation | AD011 |
| Sluice | Utterances with question words: how, where, when, which, what, why | AD007 |
| Verb Phrase Ellipsis | Verb Phrase Ellipsis, when customer utterance has the verb token or phrase elided | AD013 |

Predicting a class that the utterance falls into may be achieved by using machine learning classifiers. For example, a Random Forest classifier and/or a Support Vector Machine classifier may be used to predict the class of the utterance. These exemplary machine learning classifiers can be trained to produce probabilistic outcomes for the class of an utterance. Table 8 below shows classification features that may be used by the partial utterance classification module.

TABLE 9

Classification Features Description

Presence of wh-words in the utterance
Presence of affirmative words in the utterance
Presence of rejection words in the utterance
Presence of acknowledgement words in the utterance
Presence of fragment connectives, either at the beginning or at the end of the utterance
Presence of affirmation/rejection/question/acknowledgement/adverb or adjective as the first word of the utterance
dialogue act class of the utterance
dialogue act class of the antecedent
Presence of noun word in the utterance
Presence of at least one main verb in the utterance
Presence of any auxiliary verbs having an associated main verb in the utterance
The subject-verb-object structure of the utterance (i.e., subject-verb-object (SVO), subject-verb simple (SV-simple), subject-verb compound (SV-compound), verb-object (VO), none)
Whether a one-word utterance is a question/propositional modifier/proper noun/noun/verb/numbers/others
Length of utterance (i.e., single, short, long)
Word and part of speech n-grams of utterance All the features listed in Table 8 are categorical in nature. These features can be extracted automatically from the current user utterance, the immediately preceding agent utterance, and their respective dialog-act class values. The partial utterance classification module may use a machine learning process, such as Support Vector Machine and Random Forest processes, to classify the user utterance into a class. In some embodiments, the partial utterance classification module may use a combination of machine learning processes to classify an utterance. For example, the partial utterance classification module may use a combination of Support Vector Machine and Random Forest processes to classify an utterance. In some embodiments, the machine learning processes may be trained using a machine learning library, such as Scikit-learn (Pedregosa et al., 2011).

A Random Forest is a collection of decision tree classifiers that grow by randomly choosing features of classification data. For each tree, a subset of classification data is drawn from the whole set with replacement (bootstrapping). Within this subset, features are chosen randomly, and thresholds are built with values at each splitting node of the decision tree. During classification, each tree decides the most probable class of an observed feature vector, and the outputs of all trees are merged. The class with the most votes is a final output of the classifier (majority voting). In some embodiments, a Random Forest with approximately 5,000 trees may be used.

A Support Vector Machine focuses directly on class boundaries. For example, in the case of a linear Support Vector Machine, the Support Vector Machine focuses on the class boundaries in an original feature space. A feature space is defined as a mapping of feature vectors in a multidimensional system, where each dimension of a feature vector corresponds to one coordinate axis. The concept is to find the largest linear margin between the feature vectors of two classes. In some embodiments, a Support Vector Machine may be used with a linear kernel.

Once an utterance has been classified, the partial utterance classification module may send the class of the utterance and the confidence score for the class to the knowledge base system. For example, method 400 includes a step 412 of sending predicted class and classification advice code to the knowledge base. The class confidence score may include the probability that an utterance fits within a class. This confidence score may depend on a variety of factors. For example, this confidence score may depend on the training corpus used to train the classifiers of the partial utterance classification module and/or the type of classifiers used, etc.

The eventual aim of resolving a partial utterance in a goal-oriented conversation is to comprehend the user utterance and advance the dialogue. To achieve this goal, the partial utterance resolution module helps in dialogue state tracking, grounding, and dialogue policy formation. The snapshot of dialogue state tracking variables at any point in a goal-oriented conversation is updated as the conversation progresses. The partial utterance resolution module records and updates the values of these variables based on the class of the utterance.

The method of analyzing a partial utterance may include retrieving the detection advice code, classification advice code, predicted class, and predicted class confidence score. For example, method 400 includes a step 414 of retrieving the detection advice code, classification advice code, predicted class, and predicted class confidence score. These pieces of information can help the resolution process. The resolution process heuristically combines the output from the preceding detection and classification parts. Rather than attempting to complete the user utterance syntactically, the goal of the resolution process is to provide advice codes to the virtual agent's dialogue management system. These advice codes can be used by the dialogue management system (along with other information) in updating the state variables of the dialogue process and in determining the next virtual agent action.

Figure 5:
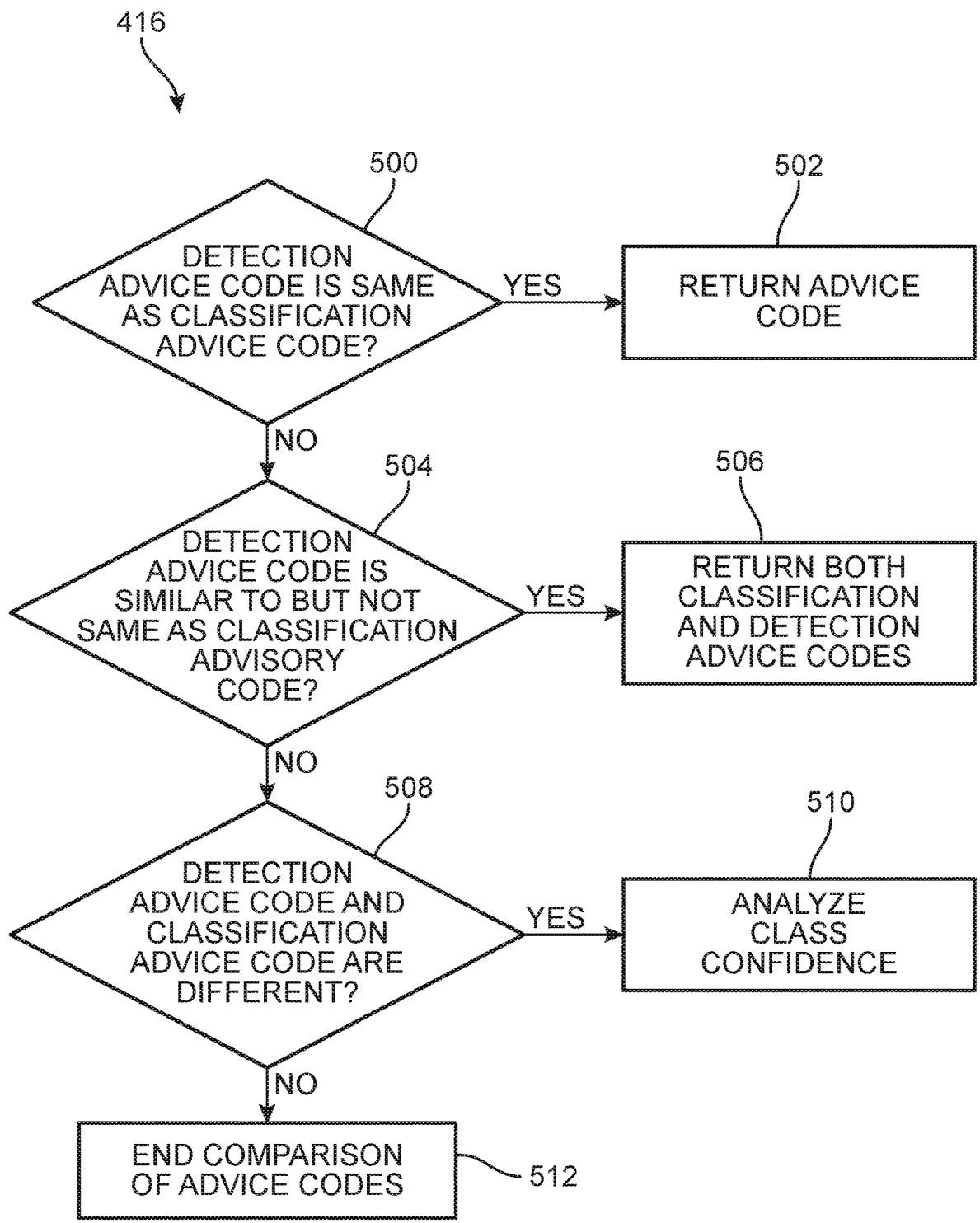
FIG. 5 is a schematic diagram of an embodiment of comparing advice codes.

The method of partial utterance analyzing may include comparing the detection advice code(s) with the classification advice code(s). For example, method 400 may include a step 416 of comparing advice codes. FIG. 5 shows an embodiment of comparing advice codes. Step 416 includes three comparisons. These comparisons may be made in any order. Comparing advice codes may include determining whether the detection advice code is the same as the classification advice code. For example, step 416 includes a step 500 of determining whether the detection advice code is the same as the classification advice code. If it is determined that the detection advice code is the same as the classification advice code, the advice code may be returned. For example, step 416 includes a step 502 of returning the advice code.

In some embodiments, if it is determined that the detection advice code is not the same as the classification advice code, then the partial utterance resolution module may move on to determining whether the detection advice code is similar to but not the same as the classification advice code. For example, step 500 may be followed by step 504 if the outcome of step 500 is "no." In other embodiments, if it is determined that the detection advice code is not the same as the classification advice code, then the partial utterance resolution module may move on to determining whether the detection advice code is different from the classification advice code.

Comparing advice codes may include determining whether the detection advice code is similar to but not the same as the classification advice code. For example, step 416 includes a step 504 of determining whether the detection advice code is similar to but not the same as the classification advice code. For the detection advice code is similar to but not the same as the classification advice code, there may be multiple detection advice codes and/or multiple classification advice codes. In this case, at least one detection advice code may be the same as at least one classification advice code. Also in this case, at least one detection advice code may be different from at least one classification advice code. For example, if an utterance is matched with rule 5 of the preliminary checks shown in Table 1, the corresponding detection advice codes are AD004_R003. If the same utterance is classified as a Fragment by Connective in Table 8, the corresponding classification advice codes are AD004_R0031 AD004_R004. Accordingly, in this example, the detection advice codes of AD004_R003 match with a set of classification advice codes and the classification advice codes of AD004_R004 do not match with the detection advice codes. Thus, the detection advice code is similar to but not the same as the classification advice code.

If it is determined that the detection advice code is similar to but not the same as the classification advice code, then both the advice code(s) and classification code(s) may be returned. For example, step 416 includes a step 506 of returning both the classification and detection advice codes.

In some embodiments, if it is determined that the detection advice code is not similar to the classification advice code, then the partial utterance resolution module may move on to determining whether the detection advice code is different from the classification advice code. For example, step 504 may be followed by step 508 if the outcome of step 504 is "no." In other embodiments, if it is determined that the detection advice code is not similar to the classification advice code, then the partial utterance resolution module may move on to determining whether the detection advice code is the same as the classification advice code. For example, step 504 may be followed by step 500.

Comparing advice codes may include determining whether the detection advice code is different from the classification advice code. For example, step 416 includes a step 508 of determining whether the detection advice code is different from the classification advice code. In some embodiments, if it is determined that the detection advice code is not different from the classification advice code, then the partial utterance resolution module may end the comparison of advice codes. For example, step 508 may be followed by step 512 if the outcome of step 508 is "no." In other embodiments, if it is determined that the detection advice code is not different from the classification advice code, then the partial utterance resolution module may move on to determining whether the detection advice code is the same or similar to the classification advice code. For example, step 508 may be followed by step 500 or step 504.

Figure 6:
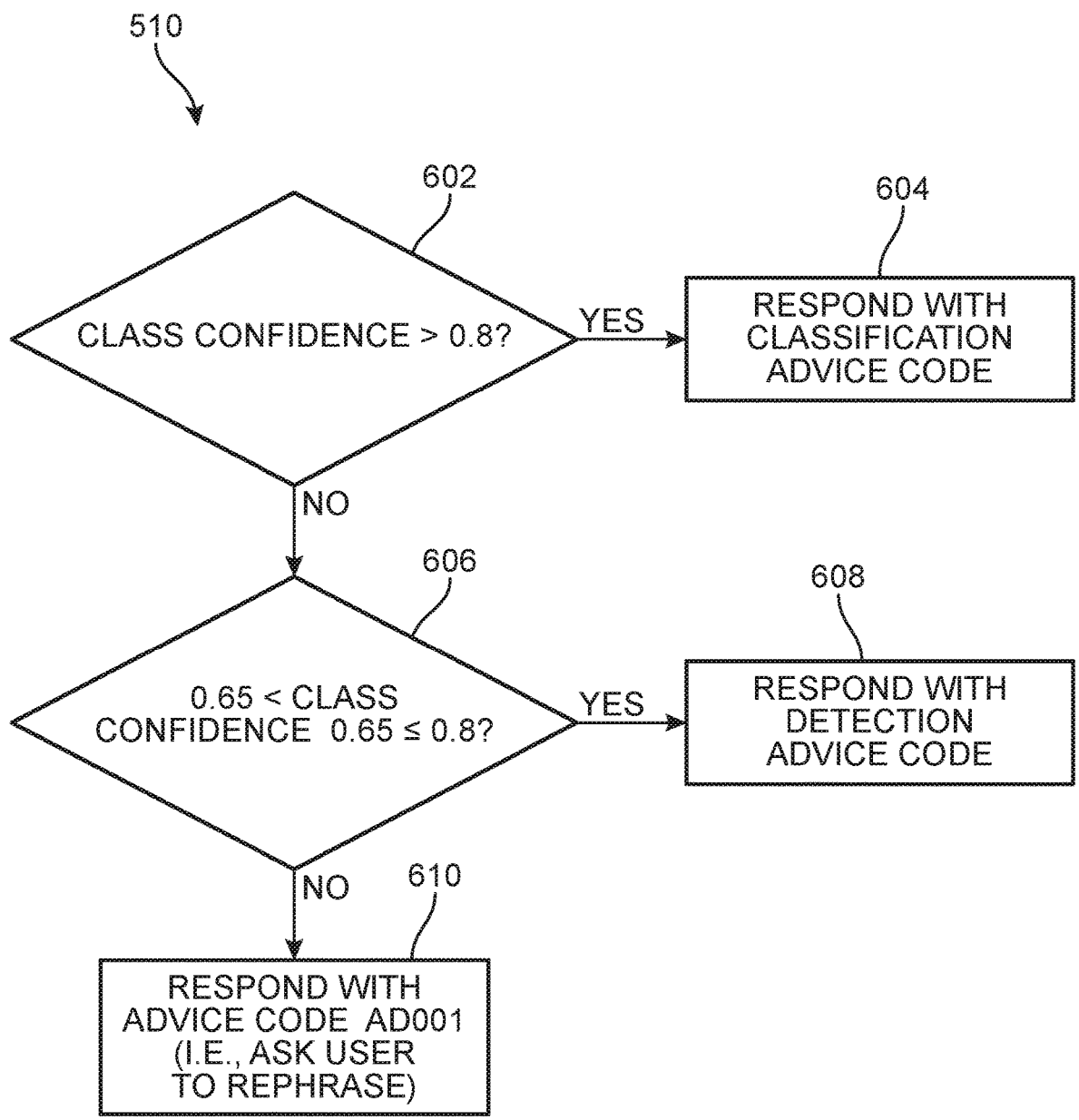
FIG. 6 is a schematic diagram of an embodiment of analyzing class confidence score.

If it is determined that the detection advice code is different from the classification advice code (e.g., detection advice code is AD006 and classification advice code is AD002), then the partial utterance resolution module analyzes the class confidence. For example, step 416 includes a step 510 of analyzing class confidence. Analyzing the class confidence may include comparing the class confidence score to at least one predetermined threshold. For example, FIG. 6 shows an embodiment of step 510. In this embodiment, the class confidence scores are compared with two thresholds: a lower threshold of 0.65 and an upper threshold of 0.8. It is understood that these thresholds may be adjusted to be higher or lower in value. For example, in some embodiments, the upper threshold may have a value within a range of 0.7 to 0.9, depending on a variety of factors (e.g., the precision values of the partial utterance classification module, etc.). Likewise, in some embodiments, the lower threshold may have a value within a range of 0.51 to 0.89, depending on a variety of factors (e.g., the precision values of the partial utterance classification module, etc.).

In some embodiments, the partial utterance resolution module may determine whether the class confidence score is above and/or equal to an upper limit. For example, step 510 may include a sub-step 602 of determining whether the class confidence score is above the upper limit of 0.8. If the class confidence score is determined to be above the upper limit, the partial utterance resolution module may respond with the classification advice code. For example, step 510 may include sub-step 604 of responding with the classification advice code. It is understood that responding with an advice code means sending the advice code to the state tracker and/or policy manager of the dialogue management system.

In some embodiments, the partial utterance resolution module may determine whether the class confidence score is below and/or equal to an upper limit and above and/or equal to a lower limit. For example, step 510 may include a sub-step 606 of determining whether the class confidence score is less than or equal to 0.8 and above 0.65. If the class confidence score is determined to be below or equal to the upper limit and above the lower limit, the partial utterance resolution module may respond with the detection advice code. For example, step 510 may include sub-step 608 of responding with the detection advice code.

In some embodiments, the partial utterance resolution module may determine whether the class confidence score is less than and/or equal a lower limit. For example, if the answer to steps 602 and 606 is no, then the class confidence score must be less than and/or equal a lower limit of 0.65. If the class confidence score is determined to be below the lower limit, the partial utterance resolution module may respond with an advice code corresponding to asking the user to rephrase. For example, step 510 may include sub-step 610 of responding with advice code AD001.

The past context, i.e. antecedent state, is included when updating the variables. For example, classifying an utterance as an Affirmative Answer corresponds with a course of action that updates the confirmation status of certain variable values of the antecedent. In other words, when the partial utterance resolution module sends along advice codes, some of these advice codes include actions related to antecedent utterances.

The partial utterance resolution module also aids in user grounding, where the agent could present confirmation questions before executing an action. For example, if an utterance classified as a Short Answer may be confirmed with the user, before the virtual agent proceeds to an actionable task. In other words, when the partial utterance resolution module sends along advice codes, some of these advice codes include actions related to confirming short answers with the user. This confirmation helps establish a mutual understanding between the virtual agent and the user before any further work is executed.

To further dialogue policy formation, the partial utterance resolution module may send certain advice codes to a policy manager of the dialogue management system. These advice codes may act as suggestions/hints for the next virtual agent action. For example, an utterance classified as an Acknowledgement, an advice code of AD009, which suggests "record customer acknowledgement and virtual agent take turn", would assist the dialogue management by providing the hint that the user has provided acknowledgement and that the next turn should be taken by the agent. In this example, the advice code of AD009 is the resolution strategy, and the dialogue management system executes this resolution strategy by recording the customer acknowledgement and by having the virtual agent take a turn.

Examples 1 and 2 will now be given to demonstrate the partial utterance detection module, partial utterance classification module, and partial utterance resolution module working together. Both examples include conversations between a human agent and a human customer to show how a virtual agent would handle the human customer's utterances. In both examples, speaker A depicts the human agent and B, the customer.

Example 1: Human Conversation from Retail Context

A: There is a charge.
B: how much
A: It could range from $39.99-$249.99
B: why the difference??
A: Let me get you the link so you can review all our prices.
B: no do not need just a simple answer In Example 1, all the three customer utterances would be detected as partially complete sentences by the partial utterance detection module. The partial utterance classification module would classify the first two customer utterances ("how much" and "why the difference?") as sluice types, since both are incomplete queries. For these first two utterances, the partial utterance resolution module would execute a resolution strategy of furnishing information to a state tracker of the dialogue management system with the state variables of each utterance and that of the agent's antecedent utterance. The partial utterance resolution module would also send an advice code to the policy manager of the dialogue management system that would suggest an action for sluice type, such as AD007. The partial utterance classification module would classify the third user utterance as Rejection Answer type, and the partial utterance resolution module would execute a resolution strategy of updating the state tracker and the policy manager with a confirmation that the user rejected the agent's antecedent utterance. The partial utterance resolution module would also recommend recording the rejection before further dialogues (e.g., AD003).

Example 2: Human Conversation from Hospitality Context

A: Good morning! Thank you for your loyalty as a member! I'll be happy to check on this for you! This is for the Daytona Beach for September 1-7?
B: yes
A: The government rate is not available for these dates. We do also offer discounts for AAA members and seniors 62 and over based on availability. If you would qualify I can check for these rates as well.
B: AAA In Example 2, the partial utterance detection module would determine that both user utterances are partial utterances. The partial utterance classification module would classify the first customer utterance as an Affirmation Answer. The partial utterance resolution module would convey this state to the state tracker and inform the policy manager to record affirmation. The partial utterance classification module would classify the second user utterance "AAA" as a Short Answer. The partial utterance resolution module would update the state tracker value to record the customer utterance in the state variable of the antecedent (e.g., AD011).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of controlling a virtual agent by analyzing partial utterances in human-machine dialogues, comprising:
receiving a user utterance;
obtaining a set of rules that define a plurality of check conditions corresponding to the detection of partial utterances, wherein each rule of the set of rules comprises a check condition and a corresponding detection advice code;
detecting whether the user utterance is a partial utterance by comparing the user utterance with the set of rules to determine whether the user utterance matches a check condition of a rule of the set of rules;
providing a detection advice code corresponding to the matched check condition if the user utterance is detected as a partial utterance, wherein the detection advice code includes at least one action to be taken in response to the user's utterance;
classifying the user utterance into a class of a plurality of classes if the user utterance is detected as a partial utterance, wherein the plurality of classes are different from the check conditions;
providing a classification advice code corresponding to the class, wherein the classification advice code includes at least one action to be taken in response to the user's utterance;
executing a resolution strategy based on at least one of the detection advice code and the classification advice code;
comparing the detection advice code with the classification advice code; and
wherein comparing the detection advice code with the classification advice code includes determining whether the detection advice code is the same as or different from the classification advice code; and wherein, when the detection code is determined to be different from the classification code, a class confidence score based on the probability that the user utterance fits within the class is analyzed, and the analysis of the class confidence score is used to determine which of the detection advice code and the classification advice code is sent to the dialogue management system.

2. The method of claim 1, wherein the set of rules includes a first set of rules and a second set of rules and comparing the user utterance to the set of rules includes comparing the user utterance to the first set of rules and then stopping the comparison if the utterance matches a rule within the first set of rules.

3. The method of claim 2, wherein comparing the user utterance to the first set of rules includes comparing the user utterance to the first set of rules and then comparing the user utterance to the second set of rules if the utterance does not match any rules within the first set of rules.

4. The method of claim 1, wherein classifying the user utterance includes applying a machine learning process using a set of classification features.

5. The method of claim 4, wherein the one or more machine learning processes include a Random Forest process and/or a Support Vector Machine process.

6. The method of claim 1, wherein at least one of the check conditions of the plurality of check conditions includes whether the utterance: is invalid in the English language, is same as an antecedent utterance, or contains greeting text.

7. The method of claim 1, wherein at least one of the check conditions of the plurality of check conditions includes one or more of the following characteristics of the user utterance: a predefined part-of-speech (POS), a predefined structure of POS, sluice text greeting text, dialogue act class, rejection text, and affirmation text.

8. The method of claim 7, further including receiving an agent utterance spoken immediately before the user utterance, wherein at least one the check condition of the plurality of check conditions include the agent utterance spoken immediately before the user utterance.

9. A non-transitory computer-readable medium storing software comprising instructions executable by one or more computers which, upon such execution, cause the one or more computers to use a spoken language understanding system to:
receive a user utterance;
obtain a set of rules that define a plurality of check conditions corresponding to the detection of partial utterances;
detect whether the user utterance is a partial utterance by comparing the user utterance with the set of rules to determine whether the user utterance matches a check condition;
provide a detection advice code corresponding to the matched check condition if the user utterance is detected as a partial utterance, wherein the detection advice code includes at least one action to be taken in response to the user's utterance;
classify the user utterance into a class of a plurality of classes if the user utterance is detected as a partial utterance, wherein the plurality of classes are different from the check conditions;

provide a classification advice code corresponding to the class, wherein the classification advice code includes at least one action to be taken in response to the users utterance;
execute a resolution strategy based on at least one of the detection advice code and the classification advice code;
compare the detection advice code with the classification advice code; and
wherein comparing the detection advice code with the classification advice code includes determining whether the detection advice code is the same as or different from the classification advice code; and
wherein, when the detection code is determined to be different from the classification code, a class confidence score based on the probability that the user utterance fits within the class is analyzed, and the analysis of the class confidence score is used to determine which of the detection advice code and the classification advice code is sent to the dialogue management system.

10. The non-transitory computer-readable medium storing software of claim 9, wherein the set of rules includes a first set of rules and a second set of rules and comparing the user utterance to the set of rules includes comparing the user utterance to the first set of rules and then stopping the comparison if the utterance matches a rule within the first set of rules.

11. The non-transitory computer-readable medium storing software of claim 10, wherein comparing the user utterance to the first set of rules includes comparing the user utterance to the first set of rules and then comparing the user utterance to the second set of rules if the utterance does not match any rules within the first set of rules.

12. The non-transitory computer-readable medium storing software of claim 9, wherein classifying the user utterance includes applying a machine learning process using a set of classification features.

13. The non-transitory computer-readable medium storing software of claim 12, wherein the one or more machine learning processes include a Random Forest process and/or a Support Vector Machine process.

14. The non-transitory computer-readable medium storing software of claim 9, wherein at least one class of a plurality of classes includes one of the following: acknowledgement, affirmation answer, rejection answer, and sluice.

15. A partial utterance analysis system, comprising:
one or more computers and one or more storage devices storing instructions that are operable, when executed by the one or more computers, to cause the one or more computers to:
receive a user utterance;
obtain a set of rules that define a plurality of check conditions corresponding to the detection of partial utterances;
detect whether the user utterance is a partial utterance by comparing the user utterance with the set of rules to determine whether the user utterance matches a check condition;
provide a detection advice code corresponding to the matched check condition if the user utterance is detected as a partial utterance, wherein the detection advice code includes at least one action to be taken in response to the user's utterance;
classify the user utterance into a class of a plurality of classes if the user utterance is detected as a partial utterance, wherein the plurality of classes are different from the check conditions;

provide a classification advice code corresponding to the class, wherein the classification advice code includes at least one action to be taken in response to the user's utterance;

execute a resolution strategy based on at least one of the detection advice code and the classification advice code;

compare the detection advice code with the classification advice code; and wherein comparing the detection advice code with the classification advice code includes determining whether the detection advice code is the same as or different from the classification advice code; and wherein, when the detection code is determined to be different from the classification code, a class confidence score based on the probability that the user utterance fits within the class is analyzed, and the analysis of the class confidence score is used to determine which of the detection advice code and the classification advice code is sent to the dialogue management system.

16. The spoken language understanding system of claim 15, wherein the set of rules includes a first set of rules and a second set of rules and comparing the user utterance to the set of rules includes comparing the user utterance to the first set of rules and then stopping the comparison if the utterance matches a rule within the first set of rules.

17. The spoken language understanding system of claim 16, wherein comparing the user utterance to the first set of rules includes comparing the user utterance to the first set of rules and then comparing the user utterance to the second set of rules if the utterance does not match any rules within the first set of rules.

18. The spoken language understanding system of claim 15, wherein classifying the user utterance includes applying a machine learning process using a set of classification features.

19. The spoken language understanding system of claim 18, wherein the one or more machine learning processes include a Random Forest process and/or a Support Vector Machine process.

20. The spoken language understanding system of claim 15, wherein at least one class of a plurality of classes includes one of the following: acknowledgement, affirmation answer, rejection answer, and sluice.

* * * * *